United States Patent [19]
Scott

[11] Patent Number: 5,200,670
[45] Date of Patent: Apr. 6, 1993

[54] SURFACE DISCHARGE PLASMA CATHODE ELECTRON BEAM GENERATING ASSEMBLY

[75] Inventor: Simon J. Scott, Bristol, United Kingdom

[73] Assignee: British Aerospace Public Limited Company, London, England

[21] Appl. No.: 592,048

[22] Filed: Oct. 4, 1990

[30] Foreign Application Priority Data

Oct. 6, 1989 [GB] United Kingdom ............ 8922602

[51] Int. Cl.$^5$ .............................................. H05H 1/24
[52] U.S. Cl. ........................ 315/111.91; 315/111.21; 313/231.31; 361/230; 361/235; 250/326
[58] Field of Search ............ 315/111.91, 111.81, 315/111.21; 313/230, 231.31; 361/230, 235; 250/324, 326

[56] References Cited

U.S. PATENT DOCUMENTS

| | | | |
|---|---|---|---|
| 3,845,307 | 10/1974 | Gallo | 250/326 |
| 4,538,204 | 8/1985 | Weber | 250/326 X |
| 4,656,356 | 4/1987 | Yoda et al. | 250/326 |
| 4,700,261 | 10/1987 | Nagase et al. | 361/225 |
| 4,816,684 | 3/1989 | Breton | 315/111.91 X |
| 4,841,146 | 6/1989 | Gundlach et al. | 250/326 X |

FOREIGN PATENT DOCUMENTS

| | | |
|---|---|---|
| 0102569 | 3/1984 | European Pat. Off. |
| 0166494 | 1/1986 | European Pat. Off. |
| 2030008 | 3/1980 | United Kingdom |
| 2079067 | 1/1982 | United Kingdom |

OTHER PUBLICATIONS

WO87/02451 A1 Dennison See FIG. 1-3.
WO87/02452 A1 Dennison See FIG. 1.
WO82/02983 A1 Dennison See FIGS. 4 and 11.

*Primary Examiner*—Eugene R. LaRoche
*Assistant Examiner*—Do Hyum Yoo
*Attorney, Agent, or Firm*—Cushman, Darby & Cushman

[57] ABSTRACT

A surface discharge plasma cathode electron beam generating assembly (1) includes an anode (2) maintainable at a substantially constant first potential, a cathode device (3) having a first electrically conductive member (4), a dielectric member (5) at least partially surrounding the first member (4) and electrically conductive means (6) located on the outer surface of the dielectric member (5) and insulated therefrom. A capacitative divider circuit (7) is provided for maintaining the first electrically conductive member (4) at a second potential different from the first potential and for maintaining the electrically conductive means (6) at a high negative third potential relative to the first and second potentials.

16 Claims, 2 Drawing Sheets

SURFACE DISCHARGE PLASMA CATHODE ELECTRON BEAM GENERATING ASSEMBLY

FIELD OF THE INVENTION

This invention relates to a surface discharge plasma cathode electron beam generating assembly particularly, but not exclusively, suitable for high energy electron beam generation.

BACKGROUND OF THE INVENTION

Wide area electron beam generating assemblies are known, for example, for generating X-rays to preionize a gas laser. One form of known assembly is a corona-plasma cathode which employs an insulating dielectric tube which contains an earthed metal liner. A metal wire array is wrapped around the tube, an earthed anode is placed close to but spaced from the wire array and the whole is housed in a container under vacuum. In operation of this known assembly a pulsed high negative voltage is applied to the wire array and gas ionization takes place at the wire-dielectric-vacuum interface to form a plasma. This interface is capacitatively ballasted to the metal liner and the plasma spreads out on the dielectric tube surface. An electron beam is driven out of the plasma to the anode under the influence of the applied field. The accelerating voltage across the anode-cathode gap is the same as that across the dielectric tube.

Such a known form of assembly has several disadvantages. A first disadvantage is that the wire array wound around the dielectric tube is prone to breakage due to erosion, causing the broken ends to spring away from the dielectric tube and the remaining wire turns to unwind from the tube with consequent failure of the assembly. Such breakage of the wire array can happen after only short periods of operation leading to only a short working life for the assembly. The second disadvantage is that the dielectric tube itself can fail relatively quickly under continuous high repetition rate operation, which is necessary for electron beam energies in excess of 70 keV. Such dielectric tube failure results from stress generated therein by the continuous high repetition rate operation and this in turn results in an undesirable reduction in working life for the assembly.

OBJECTS OF THE INVENTION

Thus one object of the present invention is to provide a generally improved surface discharge plasma cathode electron beam generating assembly which has an improved working life and preferably, the capability of working under continuous high repetition rate conditions of operation.

This and other objects and advantages of the present invention will become more apparent from details disclosed in the following specification where preferred embodiments of the invention are described.

SUMMARY OF THE INVENTION

According to the present invention there is provided a surface discharge plasma cathode electron beam generating assembly, including an anode maintainable at a substantially constant first potential; a cathode device, which cathode device has a first electrically conductive member, a dielectric member at least partially surrounding the first member, and electrically conductive means located on the surface of the dielectric member most remote from the first member and insulated from said first member; a high voltage source and a capacitative divider circuit for maintaining the first electrically conductive member at a second potential different from said first potential and for maintaining the electrically conductive means at a high negative third potential relative to said first and second potentials, so that only a small fraction of the total voltage supplied by the source to the anode and cathode device is applied across the dielectric member to ionize gas and create a plasma in the gap between the anode and the electrically conductive means and the full potential across the gap is used to form and accelerate an electron beam in the gap.

Advantageously the capacitative divider circuit is operable to maintain the first electrically conductive member at a pulsed negative second potential.

Preferably the capacitative divider circuit is operable to hold the anode first potential at ground potential.

Conveniently the dielectric member is an elongated tube made of an erosion resistant dielectric material such as quartz, glass, alumina or sapphire.

Advantageously the electrically conductive means is in the form of strips of metal, such as copper attached to the outermost surface of the dielectric member, preferably by adhesive.

Conveniently the strips of metal are attached to the dielectric members so as to extend in spaced apart, substantially parallel, side by side array, at least partially around the dielectric member periphery transverse to the longitudinal axis of the dielectric member.

Alternatively the strips of metal are attached to the dielectric member so as to extend in spaced apart, substantially parallel, side by side array along the dielectric member outer surface substantially in the direction of the longitudinal axis of the dielectric member.

Preferably the electrically conductive means includes a substantially cylindrical, longitudinally interrupted clamp or shield made of metal, surrounding the strips of metal and in contact with the outer surface thereof, with the clamp or shield interruption opening in the direction of the anode.

Alternatively the electrically conductive means in the form of a substantially cylindrical, longitudinal interrupted shield made of metal surrounding an in contact with the outer surface of the dielectric member, with the shield interruption opening in the direction of the anode.

Conveniently the longitudinal edges of the shield defining and bounding the interruption are extended to form wings projecting substantially at right angles to the outer surface of the dielectric member.

Advantageously the capacitative divider circuit includes a first capacitor connected between the anode on the one hand and the first electrically conductive member and electrically conductive means on the other hand, and includes a second capacitor connected in series with the first capacitor between the latter and the electrically conductive means, with the first electrically conductive member being connected to a conductor joining the first and second capacitors at a point between the first and second capacitors.

DESCRIPTION OF THE DRAWINGS

For a better understanding of the present invention, and to show how the same may be carried into effect, reference will now be made by way of example to the accompanying drawings, in which.

DESCRIPTION OF EMBODIMENTS OF THE INVENTION

Figure 1:
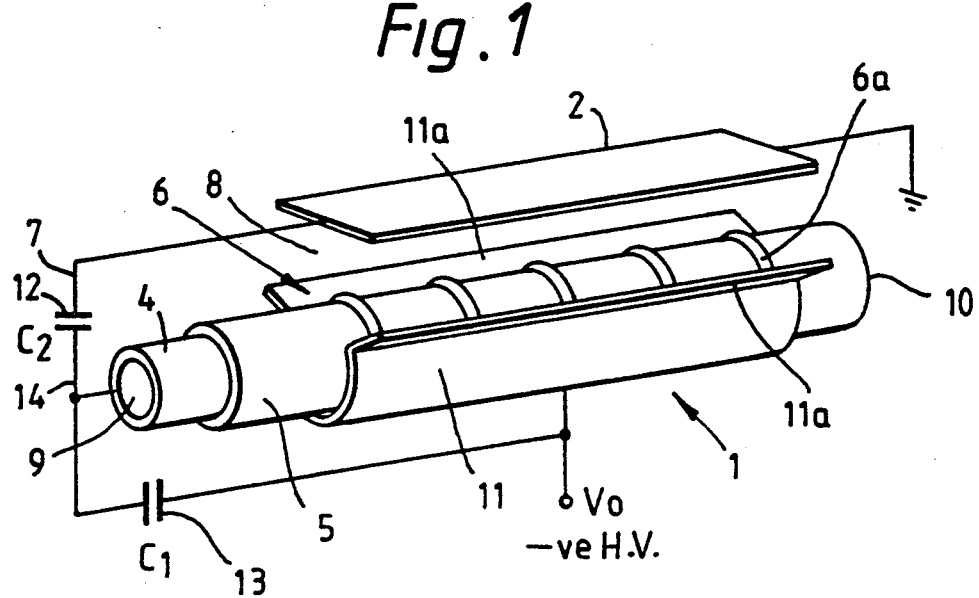
FIG. 1 is a schematic diagrammatic perspective view of a surface discharge plasma cathode electron beam generating assembly according to a first embodiment of the invention.
Figure 3:
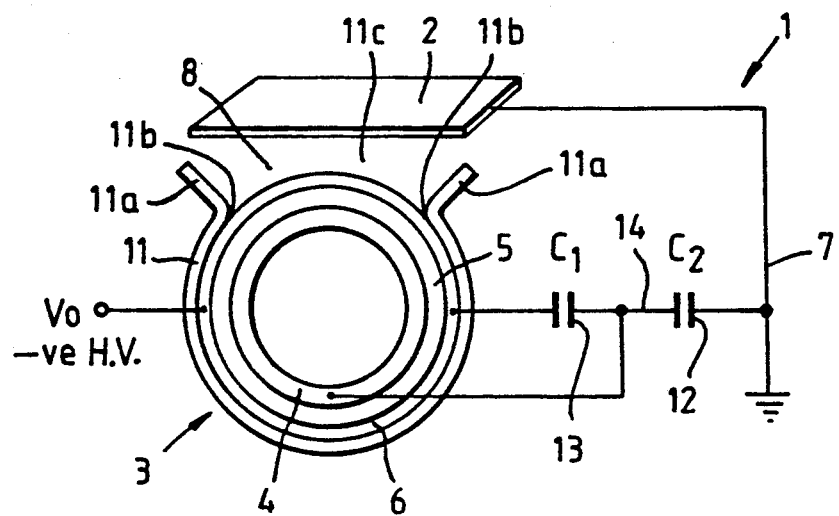
FIG. 3 is a schematic cross-sectional view of an assembly according to FIG. 1.

A surface discharge plasma cathode electron beam generating assembly according to a first embodiment of the invention is generally indicated at 1 in FIGS. 1 and 3 of the accompanying drawings. This assembly 1 includes an anode 2 made of any convenient electrically conductive material such as metal, preferably in sheet form as shown in FIGS. 1 and 3, which anode 2 is maintainable at a substantially constant first potential $V_O$. The assembly 1 also includes a cathode device generally indicated at 3 in FIG. 3 which cathode device has a first electrically conductive member 4, a dielectric member 5 at least partially surrounding the first member 4 and electrically conductive means 6 located on the surface of the dielectric member 5 most remote from the first electrically conducted member 4 and insulated from the member 4.

The assembly 1 also includes a high voltage source, not shown, and a capacitative divider circuit 7 for maintaining the first electrically conductive member 4 at a second potential $V_2$ different from the first potential and for maintaining the electrically conductive means 6 at a high negative third potential $V_1$ relative to the first and second potentials. Preferably the second potential $V_2$ is a pulsed negative voltage. In this way only a small fraction of the total voltage supplied by the source to the anode 2 and cathode device 3 is applied across the dielectric member 5 to ionise gas and create a plasma in the gap 8 between the anode 2 and the electrically conductive means 6 and the full potential across the gap 8 is used to form and accelerate an electron beam in the gap 8.

The capacitative divider circuit 7 is operable to hold the anode first potential at ground potential. The first electrically conductive member 4 is an elongated tube of metal. Conveniently the tubular first electrically conductive member 4 has inlet means 9 and outlet means 10 whereby a coolant, such as water can be conducted through the first member interior to prevent over heating of the assembly 1.

The dielectric member 5 preferably also is an elongated tube made of an erosion resistant hard dielectric material such as quartz, glass, alumina or sapphire. In one form the electrically conductive means 6 is in the form of strips 6a of metal such as copper, attached to the outermost surface of the dielectric member 5. For example, in the embodiment illustrated in FIG. 1 the strips of metal 6a are attached to the dielectric member 5 so as to extend in spaced apart, substantially parallel side by side array at least partially around the dielectric member periphery transverse to the longitudinal axis of the dielectric member 5.

Figure 2:
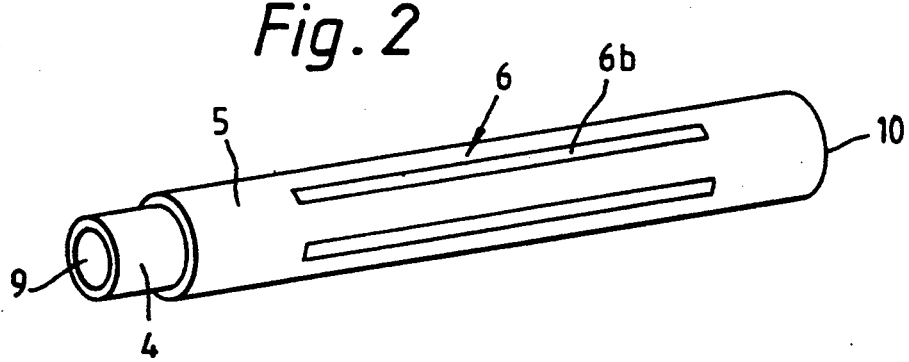
FIG. 2 is a perspective view of an alternative construction of part of the assembly of FIG. 1.

Alternatively in the embodiment shown partially in FIG. 2 the strips of metal 6b are attached to the dielectric member 5 so as to extend in spaced apart, substantially parallel, side by side array along the dielectric member outer surface substantially in the direction of the longitudinal axis of the dielectric member 5. The strips of metal 6a, 6b are attached to the dielectric member 5 in any convenient way such as by adhesive. In the FIG. 1 embodiment the strips 6a conveniently are less than or equal to 5 millimeters wide and have a thickness of in the range of from 10 to 100 micrometers spaced apart at a spacing of 3 to 4 centimeters.

In the previously described known assembly using wire wound around the dielectric member the wire array can break and the broken ends spring up away from the dielectric member 5 to such an extent that the cathode device could be shorted to the anode. This can happen relatively quickly in the life of the known assembly resulting in a short working life for such a known assembly. On the contrary the use of strips of metal 6a, 6b in the assembly 1 of the present invention means that there is a much larger amount of metal present of the dielectric member 5 and hence a much larger amount of metal to erode away than in the case of the wires. The strips 6a and 6b will not spring away from the dielectric member 5 even if eroded through and broken by virtue of their adhesion to the dielectric member 5 by adhesive. Thus even if broken the strips 6a, 6b will not affect adversely the performance of the assembly. Hence the longer working life of the strips 6a, 6b before erosion causes breakage and the use of the adhesive to prevent the broken ends of the strips springing away from the dielectric member 5 and shorting to the anode 2 considerably prolongs the safe working life of the assembly 1.

Additionally the use of a hard dielectric material for the member 5 reduces the erosion of this member by the plasma and again contributes a longer working life for the assembly 1.

As an additional aid to improving the working life of an assembly 1 of the invention the strips 6a, 6b may be held against the dielectric member 5, with or without the use of adhesive, by means of a surrounding clamp or shield 11 which forms part of the means 6. If used such a clamp 11, which preferably has shielding wings 11a extending substantially at right angles to the surface of the means 6, must not obscure the region of the strips of metal 6a, 6b, directly bordering the gap 8 between the cathode device 3 and the anode 2. The clamp or shield 11 is made of electrically conductive material, for example metal, such as copper.

The clamp or shield 11 is substantially cylindrical and longitudinally interrupted at 11c and surrounds the strips 6a, 6b of metal and is in contact with the outer surface thereof. The clamp or shield interruption 11c opens in the direction of the anode 2 at the gap 8.

Figure 4:
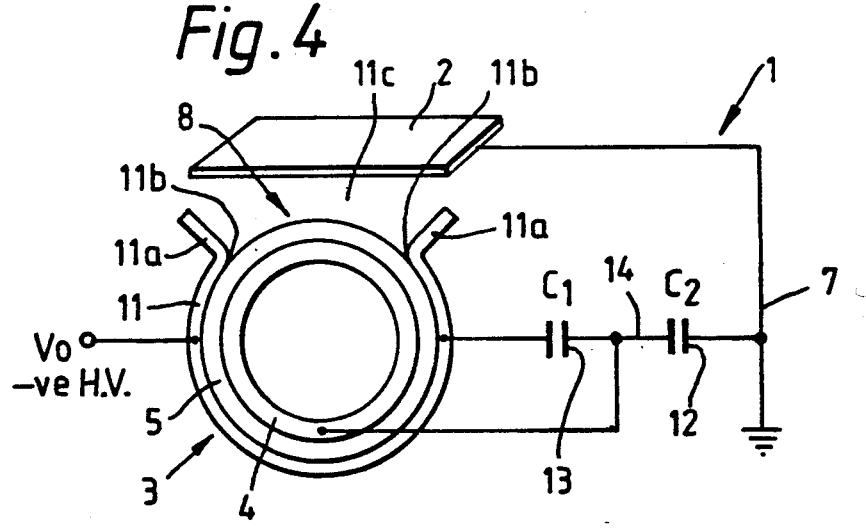
FIG. 4 is a schematic cross-sectional view of an alternative form of assembly to that of FIG. 1.

Alternatively the strips 6a, 6b can be omitted and the electrically conductive means 6 provided solely by the clamp or shield 11. To this end, and in the illustrated embodiments, the clamp or shield 11 is made of metal, such as copper, which is electrically conductive, and the sharp edges 11b made by the junction of the wings 11a with the surface of the dielectric member 5 constitute the equivalent of the longitudinal strips 6a. Such an alternative is shown in FIG. 4, in which the components which are identical to those of FIGS. 1 to 3 have been given like reference numbers. In the FIG. 4 embodiment the shield 11 surrounds and is in contact with the outer surface of the dielectric member 5, with the shield interruption 11c opening in the direction of the anode 2 at the gap 8.

The longitudinal edges 11b of the shield 11 defining and bounding the interruption 11c are extended to form the wings projecting substantially at right angles to the outer surface of the dielectric member 5.

The capacitative divider circuit 7 includes a first capacitor 12 ($C_2$) connected between the anode 2 on the one hand and the first electrically conductive member 4 on the other hand. The circuit 7 also includes a second capacitor 13 connected in series with the capacitor 12 between the latter and the electrically conductive means 6, i.e. strips 6a, 6b or shield 11. The first electrically conducted member 4 is connected to a conductor 14 joining the capacitors 12 and 13 at a point between the capacitors 12 and 13. In practice the capacitor 13 ($C_1$) maybe provided by the stray capacitance between the electrically conductive means 6 and the plasma externally of the dielectric member 5 on the one hand and the first electrically conductive member 4 on the other hand. Typically the value $C_1$ is 500 pF which is the inherent capacitance of the cathode device 3.

The capacitor 12 ($C_2$) is placed in series with the capacitor 13 ($C_1$) to form the capacitative voltage divider 7 between cathode device 3 and anode 2. The applied voltage V is split between $C_1$ and $C_2$ according to:

$$\frac{C_2}{C_1} = \frac{V_1}{V_2}$$

where
$V_1$ and $V_2$ are the voltages across $C_1$ and $C_2$ and $V_1 + V_2 = V_0$ $$V_1 = \frac{C_2 V_0}{C_1 + C_2}$$

Thus one can apply the desired fraction of $V_0$ across the dielectric member 5 (i.e. $V_1$) to create a plasma while using the full potential across the anode-cathode gap to accelerate the electron beam to $V_0$ eV. The reason for doing this is that the dielectric has an electrical breakdown threshold ($V_L$) which to a first approximation is proportional to thickness.

In this way the use of the divider circuit 7 enhances the life of the dielectric member 5 by providing less high voltage stress across the dielectric member 5 than is produced in the known assembly hereinbefore described. Additionally the assembly of the invention requires only a single source of voltage and utilizes a constant applied potential. Hence the assembly of the invention may be capable of sustained repetitive rate operation for more than $10^9$ shots at greater than 1 kHz.

Various modifications and alterations may be made to the embodiments of the present invention described and illustrated, within the scope of the present invention as defined in the following claims.

What is claimed is:

1. A surface discharge plasma cathode electron beam generating assembly, including:
   an anode maintainable at a substantially constant first potential;
   a cathode device, said cathode device having a first electrically conductive member, a dielectric member at least partially surrounding the first member, and electrically conductive means disposed on the surface of the dielectric member most remote from the first member and insulated from said first member;
   only a single high voltage source; and
   a capacitative divider circuit for maintaining the first electrically conductive member at a second potential different from said first potential and for maintaining the electrically conductive means at a high negative third potential relative to said first and second potentials, so that only a small fraction of the total voltage supplied by the source to the anode and cathode device is applied across the dielectric member to ionize gas and create a plasma in a gap between the anode and the electrically conductive means and the full potential across the gap is used to form and accelerate an electron beam in the gap.

2. An assembly according to claim 1, wherein the capacitative divider circuit is operable to maintain the first electrically conductive member at the second potential at a pulsed negative potential 3. An assembly according to claim 2, wherein the capacitative divider circuit is operable to hold the anode first potential at ground potential.

4. An assembly according to claim 3, wherein the first electrically conductive member is an elongated tube of metal.

5. An assembly according to claim 4, wherein the tubular first electrically conductive member has inlet and outlet means whereby a coolant can be conducted through the first member interior.

6. An assembly according to claim 5, wherein the dielectric member is an elongated tube made of an erosion resistant dielectric material.

7. An assembly according to claim 6, wherein the erosion resistant dielectric material is quartz, glass, alumina or sapphire.

8. An assembly according to claim 7, wherein the electrically conductive means is includes strips of metal attached to the outermost surface of the dielectric member.

9. An assembly according to claim 8, wherein the strips of metal are made of copper.

10. An assembly according to claim 8 or claim 9, wherein the strips of metal are attached to the dielectric member so as to extend in spaced apart, substantially parallel, side by side array at least partially around the dielectric member periphery transverse to the longitudinal axis of the dielectric member.

11. An assembly according to claim 8 or claim 9, wherein the strips of metal are attached to the dielectric member so as to extend in spaced apart, substantially parallel, side by side array along the dielectric member outer surface substantially in the direction of the longitudinal axis of the dielectric member.

12. An assembly according to claim 11, wherein the strips of metal are attached to the dielectric member by adhesive.

13. An assembly according to claim 12, wherein the electrically conductive means further includes a substantially cylindrical, longitudinally interrupted clamp or shield made of metal, surrounding the strips of metal and in contact with the outer surface thereof, with a clamp or shield interruption opening in a direction of the anode.

14. An assembly according to claim 7, wherein the electrically conductive means is in the form of a substantially cylindrical, longitudinally interrupted shield made of metal surrounding and in contact with the outer surface of the dielectric member, with a shield interruption opening in a direction of the anode.

15. An assembly according to claim 13, wherein the longitudinal edges of the shield defining and bounding the interruption opening are extended to form wings projecting subsequently at right angles to the outer surface of the dielectric member.

16. An assembly according to claim 15, wherein the capacitative divider circuit includes a first capacitor connected between the anode on the one hand and the first electrically conductive member and electrically conductive means on the other hand, and includes a second capacitor connected in series with the first capacitor between the first capacitor and the electrically conductive means, with the first electrically conductive member being connected to a conductor joining the first and second capacitors at a point between the first and second capacitors.

* * * * *